(12) United States Patent
Mukae

(10) Patent No.: US 12,214,908 B2
(45) Date of Patent: Feb. 4, 2025

(54) FLYING PATH PREDICTION METHOD, GROUND SYSTEM, FLYING OBJECT'S FLYING PATH MODEL, FLYING PATH PREDICTION DEVICE, FLYING OBJECT TRACKING SYSTEM, FLYING OBJECT COPING SYSTEM, UNIFIED DATA LIBRARY, SURVEILLANCE SATELLITE, AND SATELLITE CONSTELLATION

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/275,404

(22) PCT Filed: Feb. 16, 2022

(86) PCT No.: PCT/JP2022/006106
§ 371 (c)(1),
(2) Date: Aug. 2, 2023

(87) PCT Pub. No.: WO2022/176894
PCT Pub. Date: Aug. 25, 2022

(65) Prior Publication Data
US 2024/0109673 A1    Apr. 4, 2024

(30) Foreign Application Priority Data
Feb. 19, 2021    (JP) ................................ 2021-024773

(51) Int. Cl.
*B64G 1/10*    (2006.01)
*F41H 11/02*    (2006.01)

(52) U.S. Cl.
CPC ......... *B64G 1/1028* (2023.08); *B64G 1/1007* (2013.01); *B64G 1/1085* (2013.01); *F41H 11/02* (2013.01)

(58) Field of Classification Search
CPC .. B64G 1/1028; B64G 1/1007; B64G 1/1085; B64G 1/10; B64G 1/242; B64G 3/00; F41H 11/02
See application file for complete search history.

(56) References Cited

U.S. PATENT DOCUMENTS

2024/0168193 A1* 5/2024 Giolito ..................... G06T 7/20

FOREIGN PATENT DOCUMENTS

| CA | 2593436 A1 * | 5/2008 | ......... G01S 13/5246 |
| JP | 2008-137439 A | 6/2008 | |

OTHER PUBLICATIONS

International Search Report and Written Opinion mailed on Apr. 12, 2022, received for PCT Application PCT/JP2022/006106, filed on Feb. 16, 2022, 8 pages including English Translation.

* cited by examiner

*Primary Examiner* — Valentina Xavier
(74) *Attorney, Agent, or Firm* — XSENSUS LLP

(57) ABSTRACT

By taking launch detection information of a flying object as a starting point, a ground system repeats process of referring to a model database that has stored therein a plurality of flying path models, analyzing flying object surveillance information measured by a subsequent surveillance satellite, excluding a nonconforming flying path model, analyzing flying object surveillance information measured by a next subsequent surveillance satellite, and excluding a nonconforming flying path model. The ground system determines a flying path model not excluded to be left as a provisional flying path prediction model. Based on flying object surveillance information measured by a plurality of subsequent surveillance satellites subsequent to the surveillance satellite, the ground system corrects a deviation amount from the provisional flying path model to predict a flying path to an impact of the flying object.

15 Claims, 14 Drawing Sheets

FLYING PATH PREDICTION METHOD, GROUND SYSTEM, FLYING OBJECT'S FLYING PATH MODEL, FLYING PATH PREDICTION DEVICE, FLYING OBJECT TRACKING SYSTEM, FLYING OBJECT COPING SYSTEM, UNIFIED DATA LIBRARY, SURVEILLANCE SATELLITE, AND SATELLITE CONSTELLATION

CROSS-REFERENCE TO RELATED APPLICATION

The present application is based on PCT filing PCT/JP2022/006106, filed Feb. 16, 2022, which claims priority from Japanese Patent Application No. 2021-024773, filed Feb. 19, 2021, the entire contents of each are incorporated herein by reference.

TECHNICAL FIELD

The present disclosure relates to a flying path prediction method, ground system, flying path model, flying path prediction device, flying object tracking system, flying object coping system, unified data library, surveillance satellite, and satellite constellation.

BACKGROUND ART

There is a technique of conducting exhaustive surveillance of an area at a specific latitude on the entire spherical surface of the earth by using a satellite constellation (for example, Patent Literature 1).

Also, as for a flying object in a ballistic orbit, there is a technique of predicting a path of the flying object by using a flying path model. Regarding this, in recent years, with the emergence of flying objects repeating intermittent injection called glide bombs, variations of flying path models increase, compared with flying objects in ballistic orbits. Also, the glide bombs have a problem of a possibility of deviation from the flying path models due to intermittent injection.

CITATION LIST

Patent Literature

Patent Literature 1: JP 2008-137439

SUMMARY OF INVENTION

Technical Problem

An object of the present disclosure is to provide a flying path prediction method of accurately predicting a flying path of a glide bomb.

Solution to Problem

A flying path prediction method includes:
predicting a flying path of a flying object by analyzing, at a ground system, flying object surveillance information acquired by a surveillance satellite in a satellite constellation including a plurality of surveillance satellites each including an infrared surveillance device, wherein
the ground system includes a database having stored therein a plurality of flying path models being a plurality of flying paths modeled for the flying object, including launch position coordinates, a flying direction, a time-series flying distance from a launch to an impact, and a flying altitude profile of the flying object, and the ground system
analyzes flying object surveillance information including
an elapsed time after launch detection measured by the infrared surveillance device included in a subsequent surveillance satellite by using the plurality of flying path models by taking launch detection information of the flying object detected by the infrared surveillance device of the surveillance satellite as a starting point,
a flying distance of the flying object, and
a flying altitude of the flying object,
the flying object surveillance information being measured by the subsequent surveillance satellite, and
excludes a nonconforming flying path model from among the plurality of flying path models,
analyzes the flying object surveillance information measured by a next subsequent surveillance satellite, thereby repeatedly performing process of excluding a nonconforming flying path model from among the plurality of flying path models,
determines a flying path model not excluded to be left as a provisional flying path prediction model, and
based on flying object surveillance information measured by a plurality of subsequent surveillance satellites subsequent to the surveillance satellite detecting the launch detection information of the flying object, corrects a deviation amount from the provisional flying path model to predict a flying path to the impact of the flying object.

Advantageous Effects of Invention

According to the present disclosure, a flying path prediction method of accurately predicting a flying path of a glide bomb can be provided.

DESCRIPTION OF EMBODIMENTS

Figure 1:
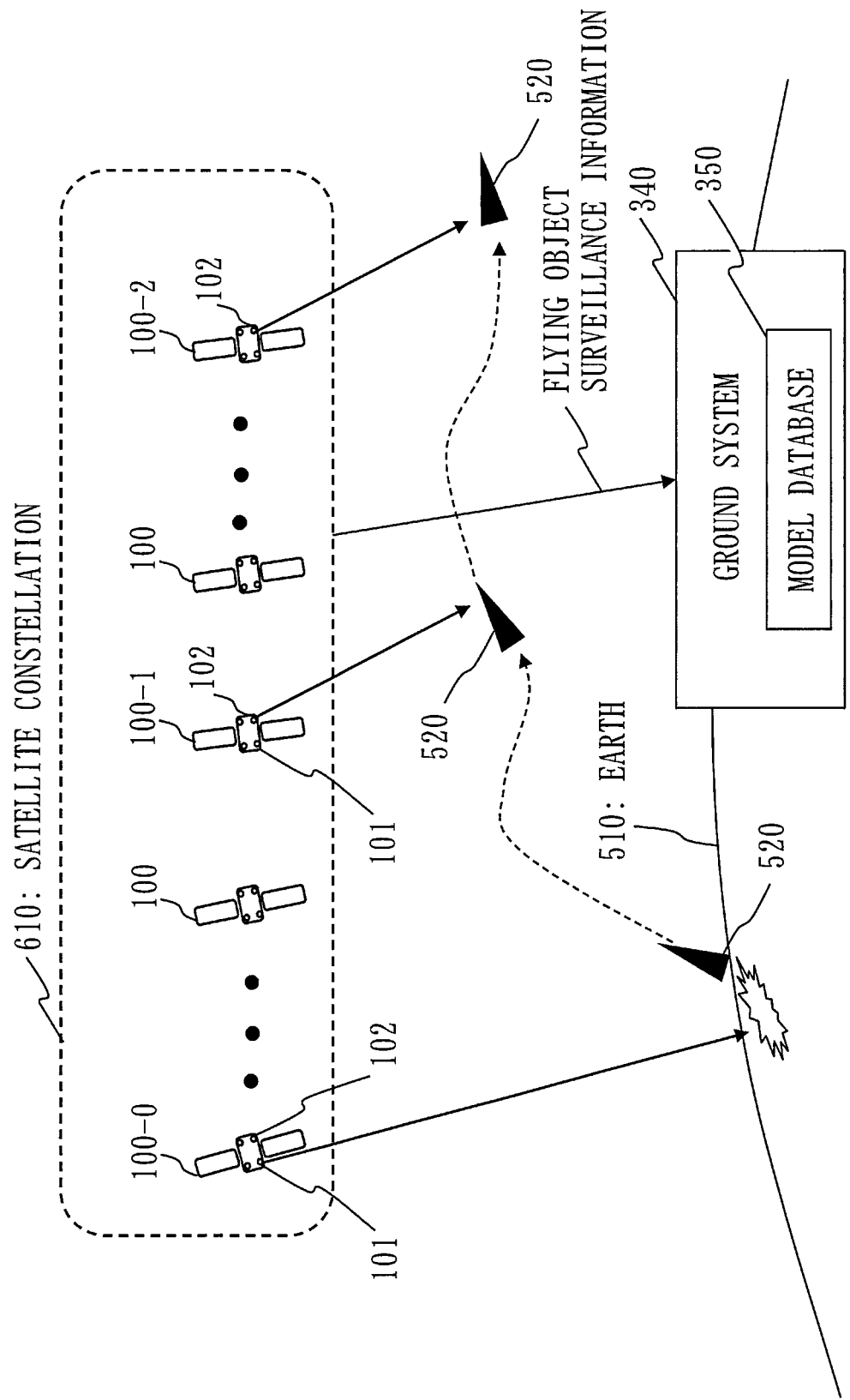
FIG. 1 is a diagram of Embodiment 1, illustrating a flying path prediction method 335.

In description of embodiments and the drawings, identical components and corresponding components are provided with the same reference character. Description of components provided with the same reference character is omitted or simplified as appropriate. In the following embodiments, a "part" may be read as a "circuit", "step", "procedure", "process", or "circuitry" as appropriate.

Embodiment 1

*Description of Structure*

FIG. 1 is a diagram illustrating a flying path prediction method 335. In the flying path prediction method 335, a satellite constellation 610 is configured of surveillance satellites 100 including infrared surveillance devices. The infrared surveillance devices are, as will be described further below, a first infrared surveillance device 101 and a second infrared surveillance device 102. The flying path prediction method 335 of Embodiment 1 is a path prediction method of analyzing, at a ground system 340, flying object surveillance information about a flying object 520 acquired by the satellite constellation 610 and performing path prediction of the flying object 520.

Figure 2:
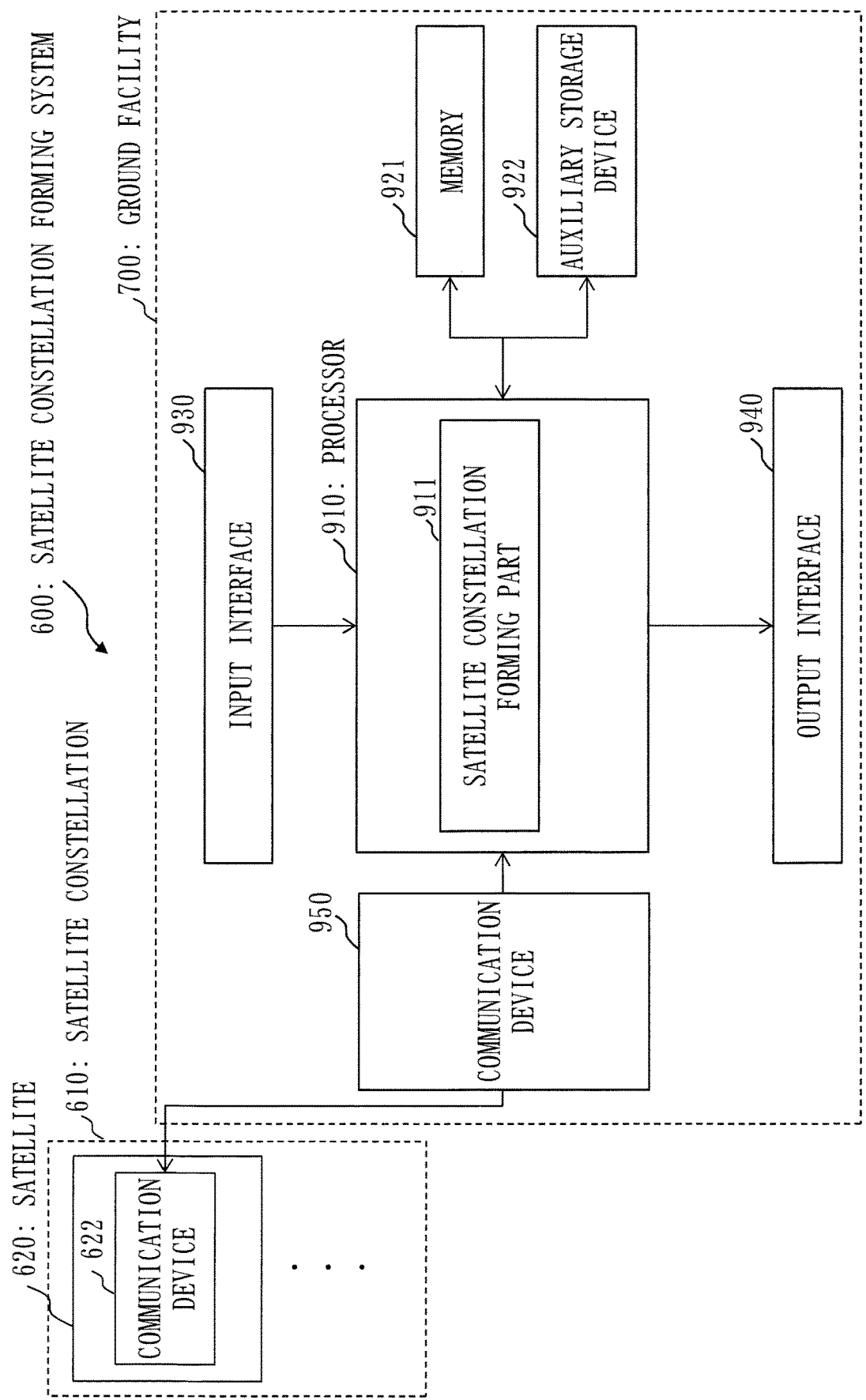
FIG. 2 is a diagram of Embodiment 1, illustrating an example of structure of a satellite constellation forming system 600.
Figure 3:
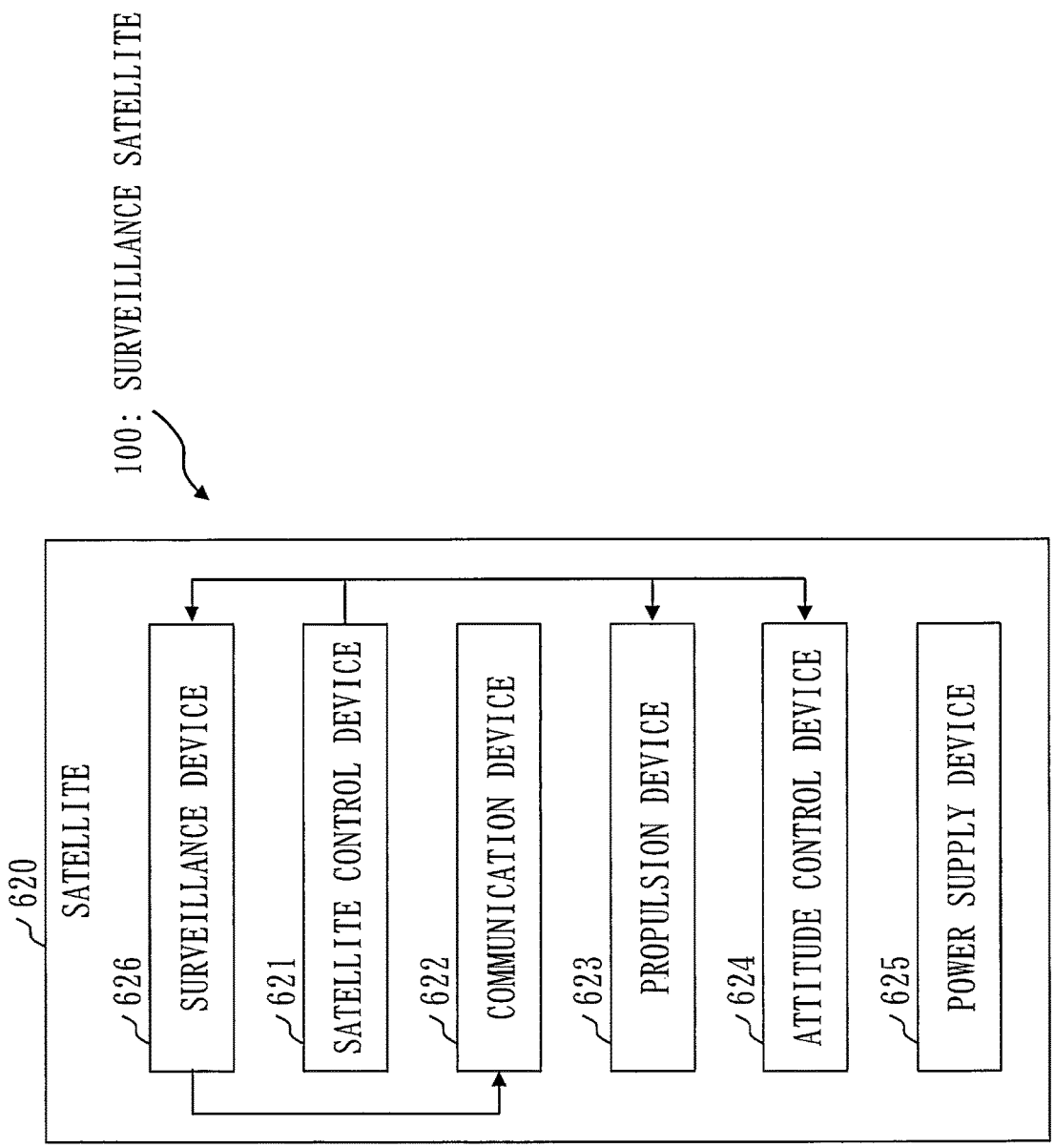
FIG. 3 is a diagram of Embodiment 1, illustrating an example of structure of a satellite 620 in the satellite constellation forming system 600.

An example of a satellite 620 and a ground facility 700 in a satellite constellation forming system 600 forming the satellite constellation 610 is described by using FIG. 2 and FIG. 3. The satellite constellation 610 is a unified satellite constellation. The satellite constellation forming system 600 may be simply referred to as a satellite constellation.

FIG. 2 illustrates an example of structure of a satellite constellation forming system 600. The satellite constellation forming system 600 includes a computer. While a structure with one computer is illustrated in FIG. 2, in practice, respective satellites 620 of a plurality of satellites configuring the satellite constellation 610 and the ground facility 700 which communicates with the satellites 620 each include a computer. And, with coordination among the computers included in the respective satellites 620 of the plurality of satellites and in the ground facility 700 which communicates with the satellites 620, the functions of the satellite constellation forming system 600 are implemented. In the following, one example of structure of the computer achieving the functions of the satellite constellation forming system 600 is described.

The satellite constellation forming system 600 includes the satellite 620 and the ground facility 700. The satellite 620 includes a communication device 622 which communicates with a communication device 950 of the ground facility 700. In FIG. 2, the communication device 622 is illustrated in the structure the satellite 620 has.

The satellite constellation forming system 600 includes a processor 910 as well as other hardware such as a memory 921, an auxiliary storage device 922, an input interface 930, an output interface 940, and the communication device 950. The processor 910 is connected via signal lines to other pieces of hardware to control these pieces of other hardware.

The satellite constellation forming system 600 includes, as a functional component, a satellite constellation forming part 911. The functions of the satellite constellation forming part 911 is implemented by hardware or software. The satellite constellation forming part 911 controls formation of the satellite constellation 610 as communicating with the satellite 620.

FIG. 3 illustrates one example of structure of the satellite 620 in the satellite constellation forming system 600. The satellite 620 includes a satellite control device 621, the communication device 622, a propulsion device 623, an attitude control device 624, a power supply device 625, and a surveillance device 626. While components implementing various functions may be included, the satellite control device 621, the communication device 622, the propulsion device 623, the attitude control device 624, the power supply device 625, and the surveillance device 626 are described in FIG. 3. The satellite 620 of FIG. 3 is an example of the surveillance satellite 100.

The satellite control device 621 is a computer which controls the propulsion device 623 and the attitude control device 624, and includes a processing circuit. Specifically, the satellite control device 621 controls the propulsion device 623 and the attitude control device 624 by following various commands transmitted from the ground facility 700.

The communication device 622 is a device which communicates with the ground facility 700. Alternatively, the communication device 622 is a device which communicates with satellites 620 at front and rear on the same orbital plane or a satellite 620 on an adjacent orbital plane. Specifically, the communication device 622 transmits various types of data regarding its satellite to the ground facility 700 or another satellite 620. Also, the communication device 622 receives various commands transmitted from the ground facility 700.

The propulsion device 623 is a device which provides propulsion to the satellite 620, and changes the speed of the satellite 620.

The attitude control device 624 is a device for controlling attitude elements such as the attitude of the satellite 620 and the angular velocity and the visual line direction (Line Of Sight) of the satellite 620. The attitude control device 624 changes each attitude elements to a desired direction. Alternatively, the attitude control device 624 maintains each attitude elements in a desired direction. The attitude control device 624 includes an attitude sensor, an actuator, and a controller. The attitude sensor is a device such as a gyroscope, earth sensor, solar sensor, star tracker, thruster, and magnetic sensor. The actuator is a device such as an attitude control thruster, momentum wheel, reaction wheel, and control moment gyro. The controller controls the actuator by following measurement data of the attitude sensor or various commands from the ground facility 700.

The power supply device 625 includes devices such as a solar cell, a battery, and a power control device, and supplies electric power to each device with which the satellite 620 is equipped.

The surveillance device 626 is a device which conducts surveillance of an object. Specifically, the surveillance device 626 is a device for monitoring or observing an object such as a space object, flying object, or mobile object on land, at sea, and in the air. The surveillance device 626 may be referred to as an observation device. For example, the surveillance device 626 is an infrared surveillance device which detects, by using infrared rays, an increase in temperature due to atmospheric friction when a flying object enters the earth's atmosphere. The surveillance device 626 detects a plume at a launch of the flying object or the temperature of the main body of the flying body. Alternatively, the surveillance device 626 may be a light-wave or radio-wave information collecting device. The surveillance device 626 may be a device which detects an object by an optical system. The surveillance device 626 takes an image of an object flying at an altitude different from the orbital altitude of an observation satellite by using an optical system. Specifically, the surveillance device 626 may be a visible light optical sensor.

The processing circuit included in the satellite control device 621 is described. The processing circuit may be dedicated hardware or a processor which executes a program stored in memory. In the processing circuit, part of the functions may be implemented by dedicated hardware and the remaining functions may be implemented by software or firmware. That is, the processing circuit can be implemented by hardware, software, firmware, or a combination of these. The dedicated hardware is, specifically, a single circuit, composite circuit, programmed processor, parallel-programmed processor, ASIC, FPGA, or a combination of these. ASIC is an abbreviation of Application Specific Integrated Circuit. FPGA is an abbreviation of Field Programmable Gate Array.

<Satellite Constellation Forming Method>

A satellite constellation 610 to be formed by the satellite constellation forming system 600 is described. The satellite constellation 610 is formed by the ground facility 700 controlling the satellite 620.

As illustrated in FIG. 1, in the flying path prediction method 335, flying object surveillance information acquired by the surveillance satellites 100 of the satellite constellation 610 including the plurality of surveillance satellites 100 including infrared surveillance devices is analyzed by the ground system 340. Here, the infrared surveillance devices are, as will be described further below, the first infrared surveillance device 101 and the second infrared surveillance device 102.

The ground system 340 includes a model database 350 having stored therein a plurality of flying path models, the plurality of flying path models including launch position coordinates, a flying direction, a time-series flying distance from a launch to an impact, and a flying altitude profile of the flying object 520 and having the plurality of flying paths modeled therein.

The ground system 340 takes launch detection information of the flying object 520 detected by the infrared surveillance device (101, 102) of a surveillance satellite 100-0 as a starting point, and uses the plurality of flying path models in the model database 350 to analyze flying object surveillance information measured by the subsequent surveillance satellite 100-1 including an elapsed time after launch detection measured by the infrared surveillance device (101, 102) included in the subsequent surveillance satellite 100-1, the flying distance of the flying object 520, and the flying altitude of the flying object 520.

Then, the ground system 340 excludes a nonconforming flying path model from among the plurality of flying path models in the model database 350, and analyzes the flying object surveillance information measured by the next subsequent surveillance satellite 100-2.

By this analysis, the ground system 340 repeatedly performs the process of excluding a nonconforming flying path model from among the plurality of flying path models.

The ground system 340 determines a flying path model not excluded in the repeatedly-performed process to be left as a provisional flying path prediction model.

Based on the flying object surveillance information measured by the plurality of subsequent surveillance satellites 100-1, 100-2 . . . subsequent to the surveillance satellite 100-0 detecting the launch detection information of the flying object 520, the ground system 340 corrects a deviation amount from the provisional flying path prediction model to predict a flying path to the impact of the flying object 520.

Figure 4:
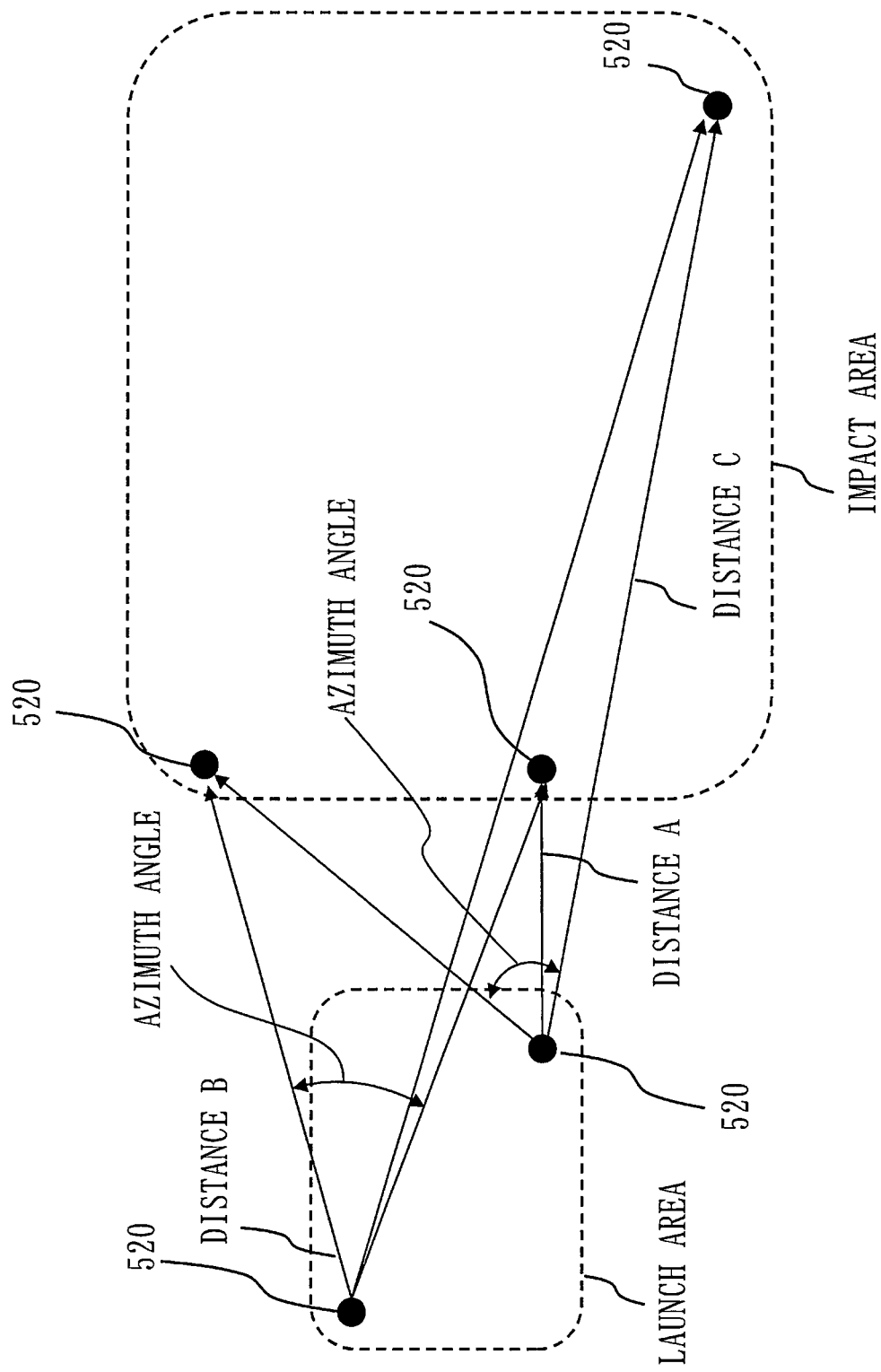
FIG. 4 is a diagram of Embodiment 1, illustrating an example of a flying path model of a ballistic flying object 521 in a state of being viewed from a certain altitude.

FIG. 4 illustrates an example of a flying path model of a ballistic flying object 521 in a state of being viewed from a certain altitude. In FIG. 4, a launch area and an impact area of a ballistic flying object 521 are illustrated.

Figure 5:
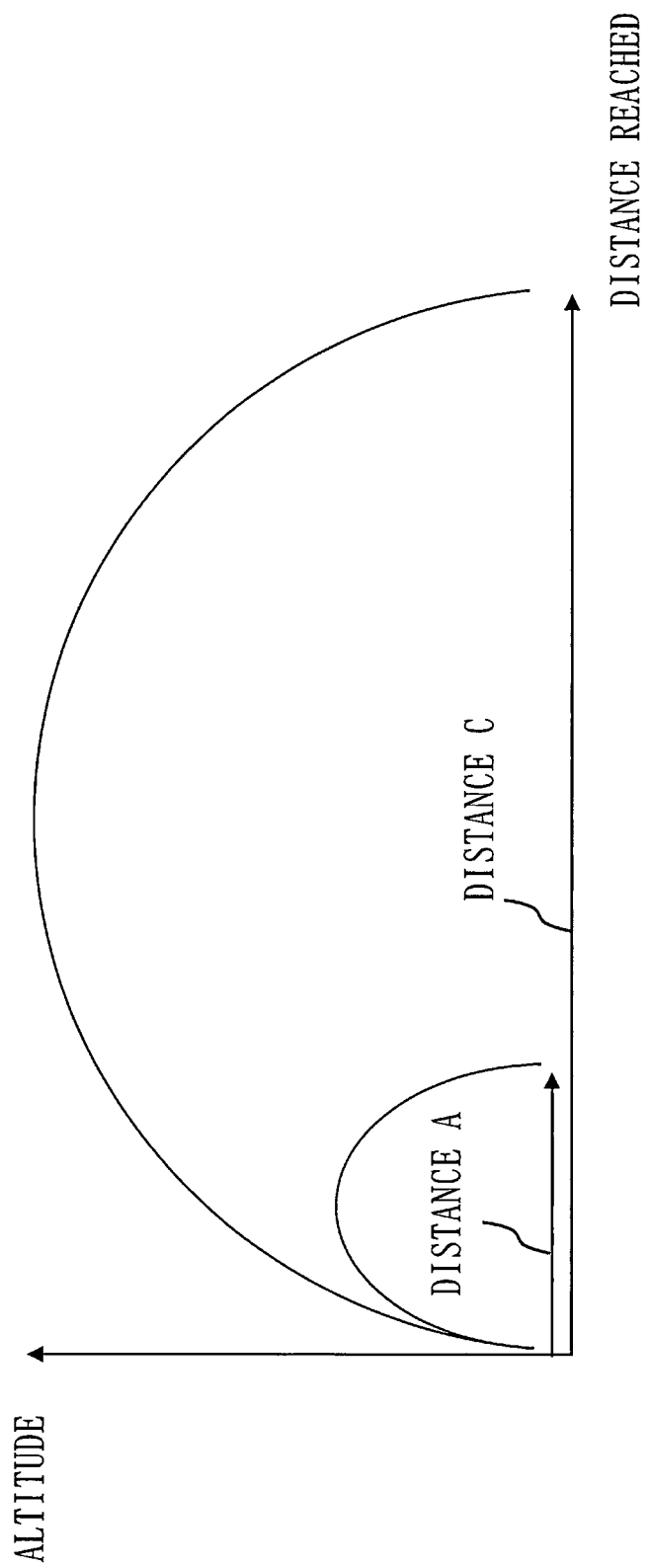
FIG. 5 is a diagram of Embodiment 1, illustrating an example of a flying path model of the ballistic flying object 521 in a distance direction and a height direction.

FIG. 5 illustrates an example of a flying path model of the ballistic flying object 521 in a distance direction and a height direction. In FIG. 5, the horizontal axis represents the flying distance of the ballistic flying object 521 and the vertical axis represents the altitude of the ballistic flying object 521.

Figure 6:
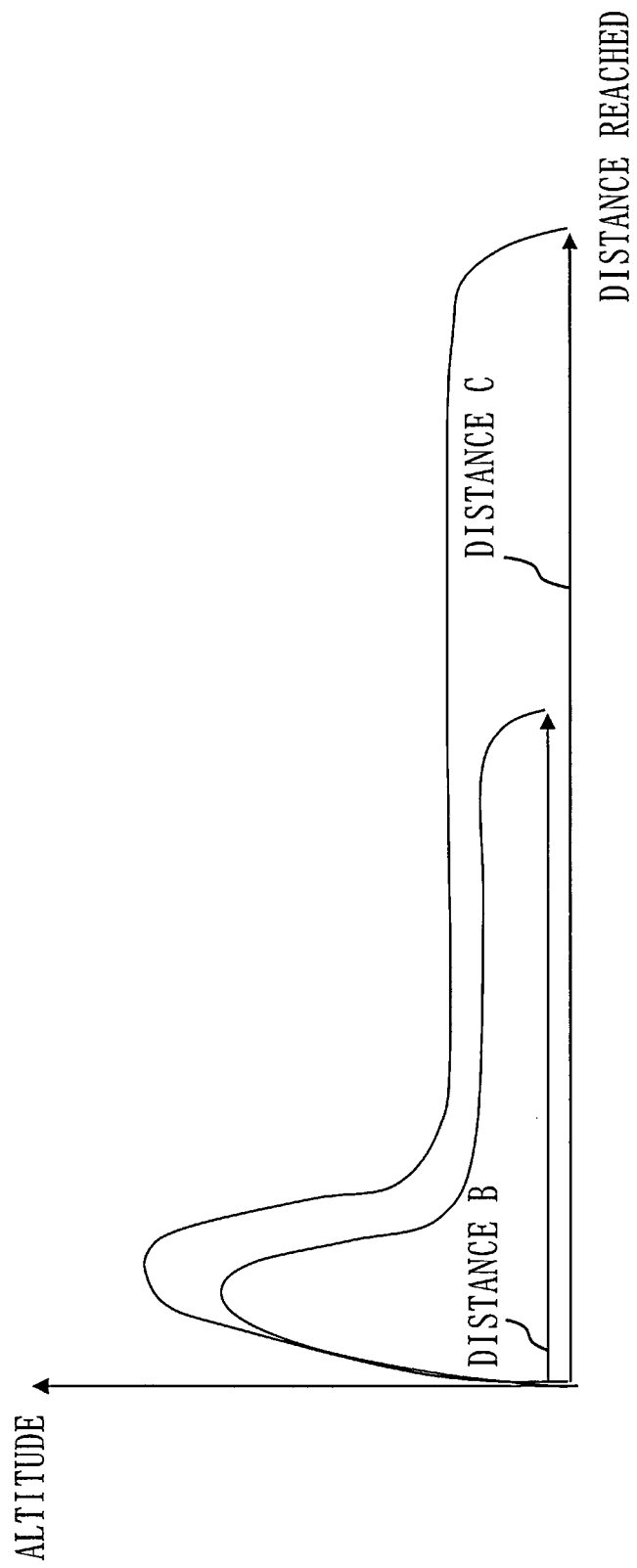
FIG. 6 is a diagram of Embodiment 1, illustrating a model of a flying path of a flying object performing intermittent injection.

FIG. 6 illustrates a model of a flying path of a flying object performing intermittent injection. FIG. 6 corresponds to FIG. 5. In FIG. 6, the horizontal axis represents the flying distance of an intermittent-injection flying object and the vertical axis represents the altitude of the intermittent-injection flying object.

When the flying object 520 which becomes a threat in security terms is a ballistic flying object, as illustrated in FIG. 4, the launch area where a launch is expected and the impact area where an impact is expected can be presumed in advance. Thus, it is possible to set, as a typical flying path model, a distance from the launch area to the impact area, a flying direction, a reach time, an orbit and reached altitude in the case of ballistic flying, and so forth.

In recent years, with the emergence of flying objects repeating intermittent injection called glide bombs, variations of flying path models increase, compared with ballistic bombs.

However, as for a glide bomb, a flying path model to the impact area can be assumed as a flying model which glides in an upper layer part of the atmosphere after the end of injection at a launch. Even if there may be a deviation from the flying path models due to intermittent injection, the change amount is subtle in both of an altitude direction and a horizontal direction, compared with the entire profile of a predicted flying path from a launch to an impact. On the presumption that the typical flying path model is a provisional flying path, with measurement information of the surveillance satellite, a correction is made with the actual orbit measurement results, thereby making it possible to generate a highly-accurate predicted flying path.

FIG. 1 is referred to. The plurality of surveillance satellites 100 include the first infrared surveillance device 101 oriented to a geocentric direction and the second infrared surveillance device 102 oriented to the circumference of the earth.

The first infrared surveillance device 101 detects high-temperature spray accompanying at a launch of the flying object to be taken as a starting point of the flying path model.

The second infrared surveillance device 102 detects, in the cosmic background, the main body of the flying object with an increase in temperature after the end of injection to be taken as reference information midway through flying of the flying path model.

FIG. 1 is referred to. High-temperature spray called a plume with injection of the propulsion device at a launch spreads in a high-temperature state over a wide area. Thus, the plume as a surveillance target taken by the first infrared surveillance device 101 oriented to the geocentric direction can be detected as identified as infrared radiation from the ground surface.

On the other hand, the main body of the flying object with an increase in temperature after the end of the launch does not become at a temperature not so high as that at spray, and the surveillance target is limited to the dimensions of the main body of the flying object. Thus, in the first infrared surveillance device 101 oriented to the geocentric direction, there is a problem called clutter in which the flying object is buried in infrared radiation information from the ground surface to become difficult to identify. To address this, according to a surveillance method oriented to the circumference of the earth called rim observation by the second infrared surveillance device 102, this has an effect in which, by conducting surveillance on a flying object by taking the outer space as a background, the flying object can be identified as a bright spot in a low-temperature background.

Figure 7:
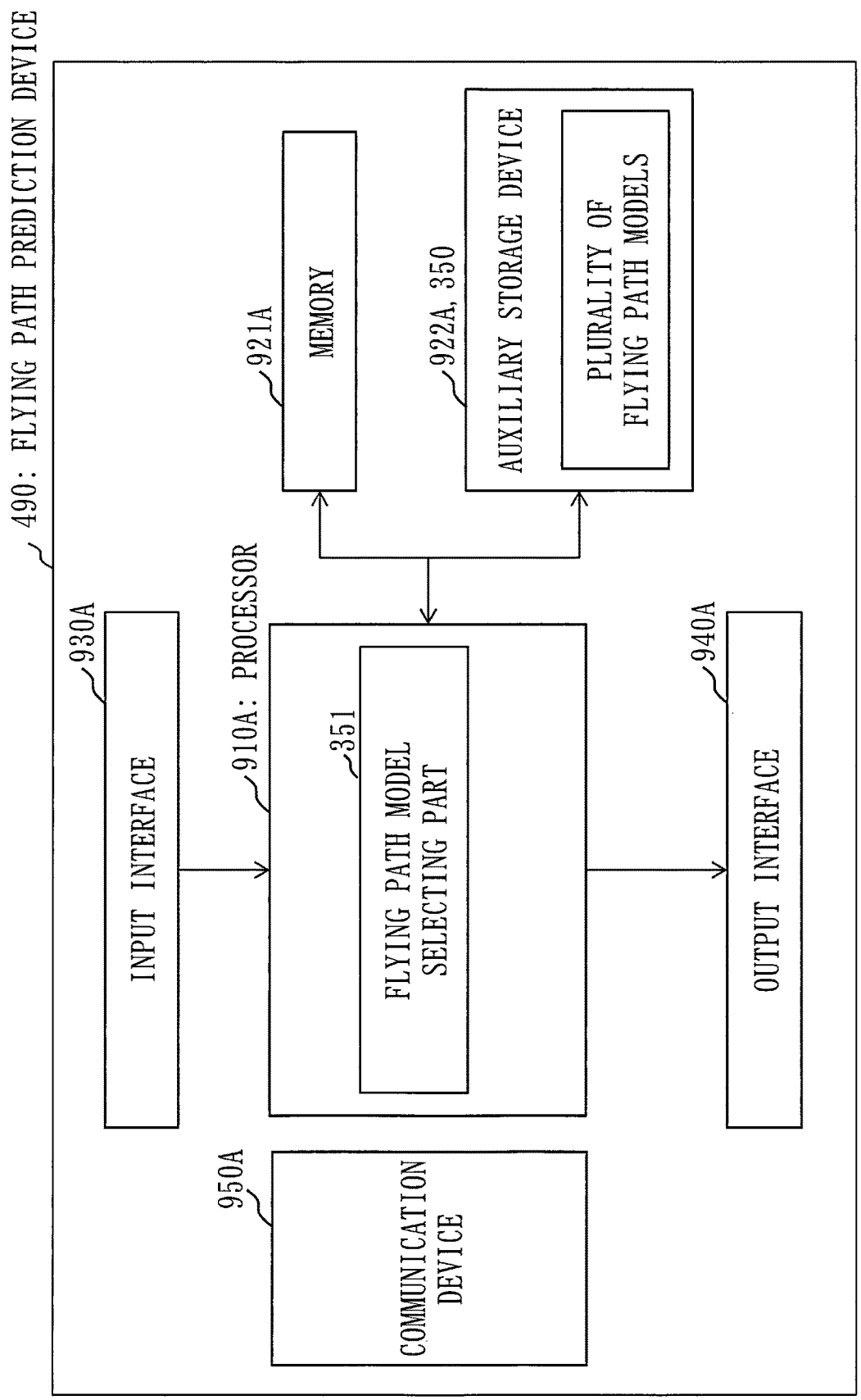
FIG. 7 is a diagram of Embodiment 1, illustrating hardware structure of a flying path prediction device 490.

FIG. 7 illustrates hardware structure of a flying path prediction device 490. The flying path prediction device 490 is a computer. The flying path prediction device 490 includes a processor 910A. The flying path prediction device 490 includes, other than the processor 910A, other pieces of hardware such as a memory 921A, an auxiliary storage device 922A, an input interface 930A, an output interface 940A, and a communication device 950A. The processor 910A is connected via signal lines to other pieces of hardware to control the other pieces of hardware. The functions of the processor 910A, the memory 921A, the auxiliary storage device 922A, the input interface 930A, the output interface 940A, and the communication device 950A are similar to the functions of the processor 910, the memory 921, the auxiliary storage device 922, the input interface 930, the output interface 940, and the communication device 950 described in FIG. 2, and therefore description is omitted.

The flying path prediction device 490 includes, as a functional component, a flying path model selecting part 351. The functions of the flying path model selecting part 351 are implemented by a program. Also, the auxiliary storage device 922A implements the model database 350.

The model database 350 in the flying path prediction device 490 has stored therein a plurality of flying path models, which are a plurality of flying paths modeled as for the flying object, including launch position coordinates, a flying direction, a time-series flying distance from a launch to an impact, and a flying altitude profile of the flying object. The flying path model selecting part 351 takes flying object surveillance information launch-detected by the surveillance satellite 100 as a starting point, and compares flying object surveillance information measured by the subsequent surveillance satellite with the plurality of flying path models to select a flying path model with a smaller deviation amount from among the plurality of flying path models stored in the model database 350.

The flying path model selecting part 351 compares the selected flying path model with the flying object surveillance information measured by the surveillance satellite 100 to correct a deviation amount and generate a corrected flying path prediction result.

Figure 8:
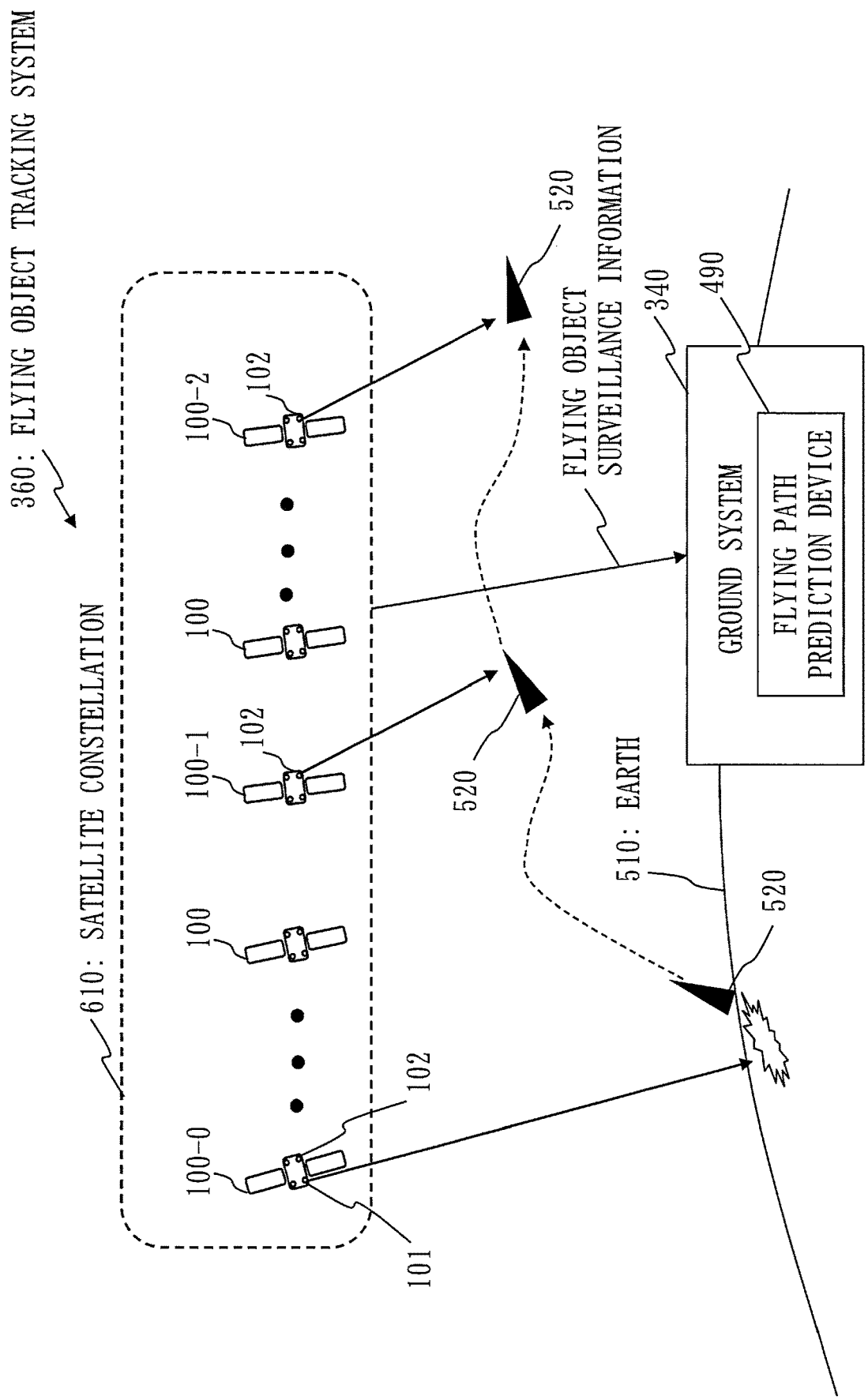
FIG. 8 is a diagram of Embodiment 1, illustrating a flying object tracking system 360.

FIG. 8 illustrates a flying object tracking system 360. The flying object tracking system 360 includes the satellite constellation 610 and the ground system 340. The flying object tracking system 360 performs detection of a launch of the flying object 520 and tracking of the flying object. The ground system 340 includes the flying path prediction device 490.

Figure 9:
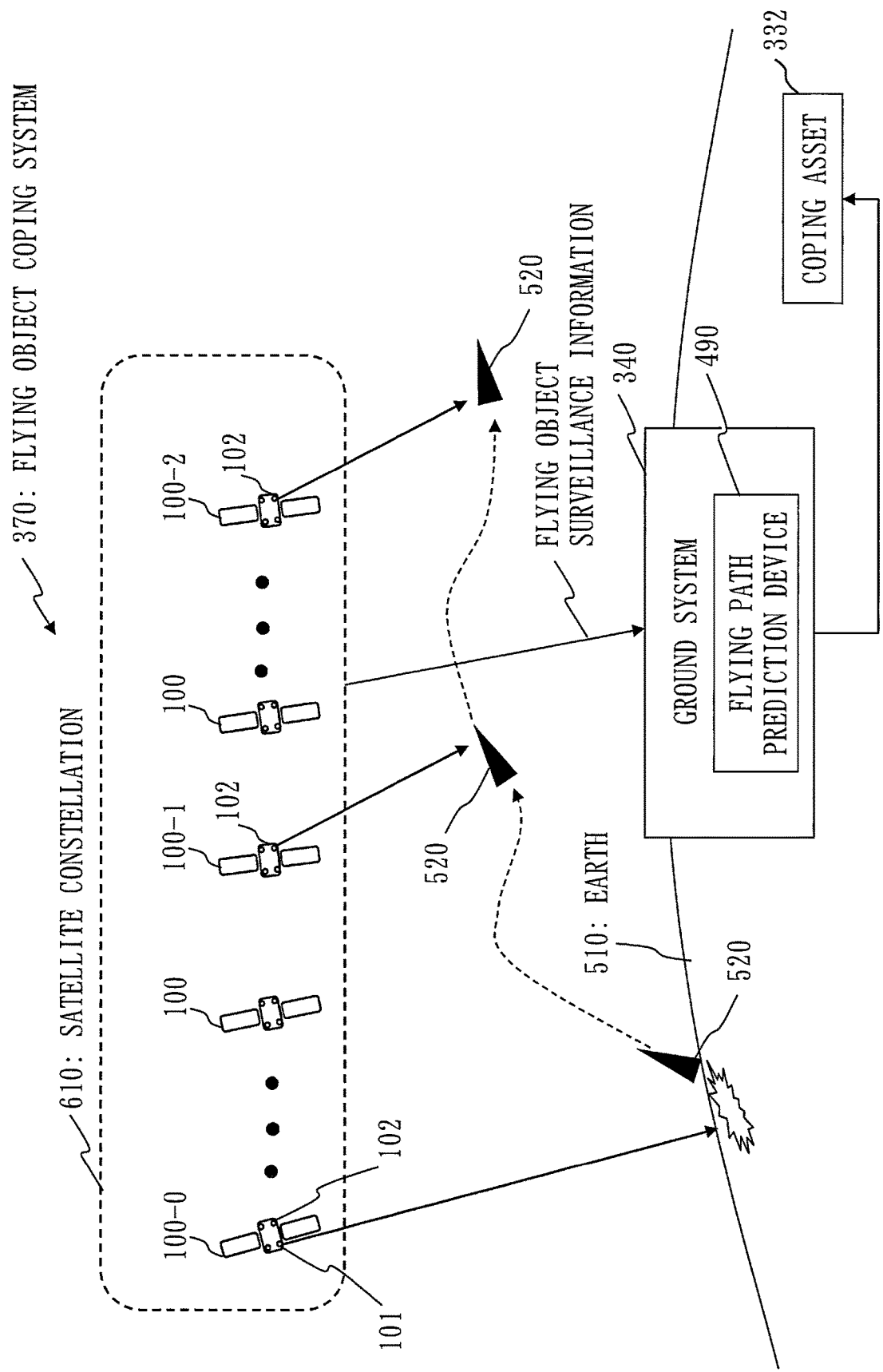
FIG. 9 is a diagram of Embodiment 1, illustrating a flying object coping system 370.

FIG. 9 illustrates a flying object coping system 370. The flying object coping system 370 includes the satellite constellation 610, the ground system 340, and a coping asset 332. The ground system 340 includes the flying path prediction device 490 and, by referring to the expectation result of the flying path prediction device 490, transfers flying object information to the coping asset 332 near a predicted flying path.

Effects of Embodiment 1

According to the flying path prediction method, ground system, flying path model, flying path prediction device, flying object tracking system, flying object coping system, and ground system of Embodiment 1, the flying path of a glide bomb can be accurately predicted.

Embodiment 2

Embodiment 2 is described with reference to FIG. 10 to FIG. 14. In Embodiment 2, a unified data library 380 having a database 381, a surveillance satellite 100 equipped with an edge server 390 having the database 381, a surveillance satellite 100 equipped with an artificial intelligence calculator 391, and a satellite constellation forming a hybrid constellation are described.

<Unified Data Library 380>

With the expansion in variety of threats and variety of surveillance systems, communication systems, and coping systems in recent years, the necessity of Joint All domain Command & Control (JADC2) has intensified, in which various ground centers act by exploiting a common database.

The ground centers may be read as domains. Information sharing of a database to be used in common can be made at various ground centers as a Unified Data Library (UDL) in a cloud environment or edge-computing environment. Furthermore, a space data center concept by satellite IoT has also been proposed, and information sharing can be made similarly at a space data center.

<Unified Data Library>

Figure 10:
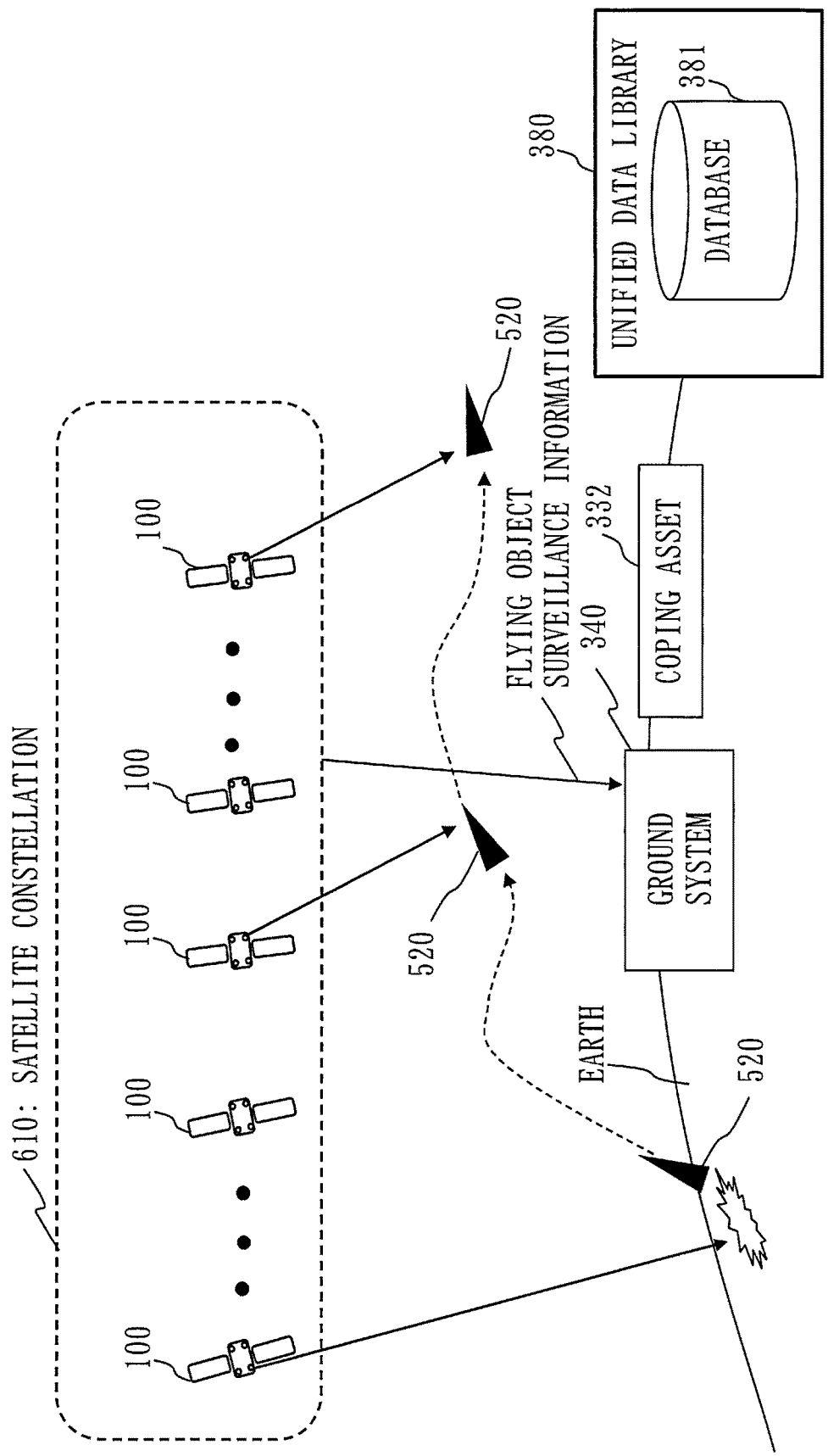
FIG. 10 is a diagram of Embodiment 2, illustrating the arrangement of a unified data library.

FIG. 10 illustrates the unified data library 380 of Embodiment 2.

The unified data library 380 is a library to be referred to by at least either of the surveillance satellite 100 and the ground system 340 in the flying path prediction method of Embodiment 1.

Figure 11:
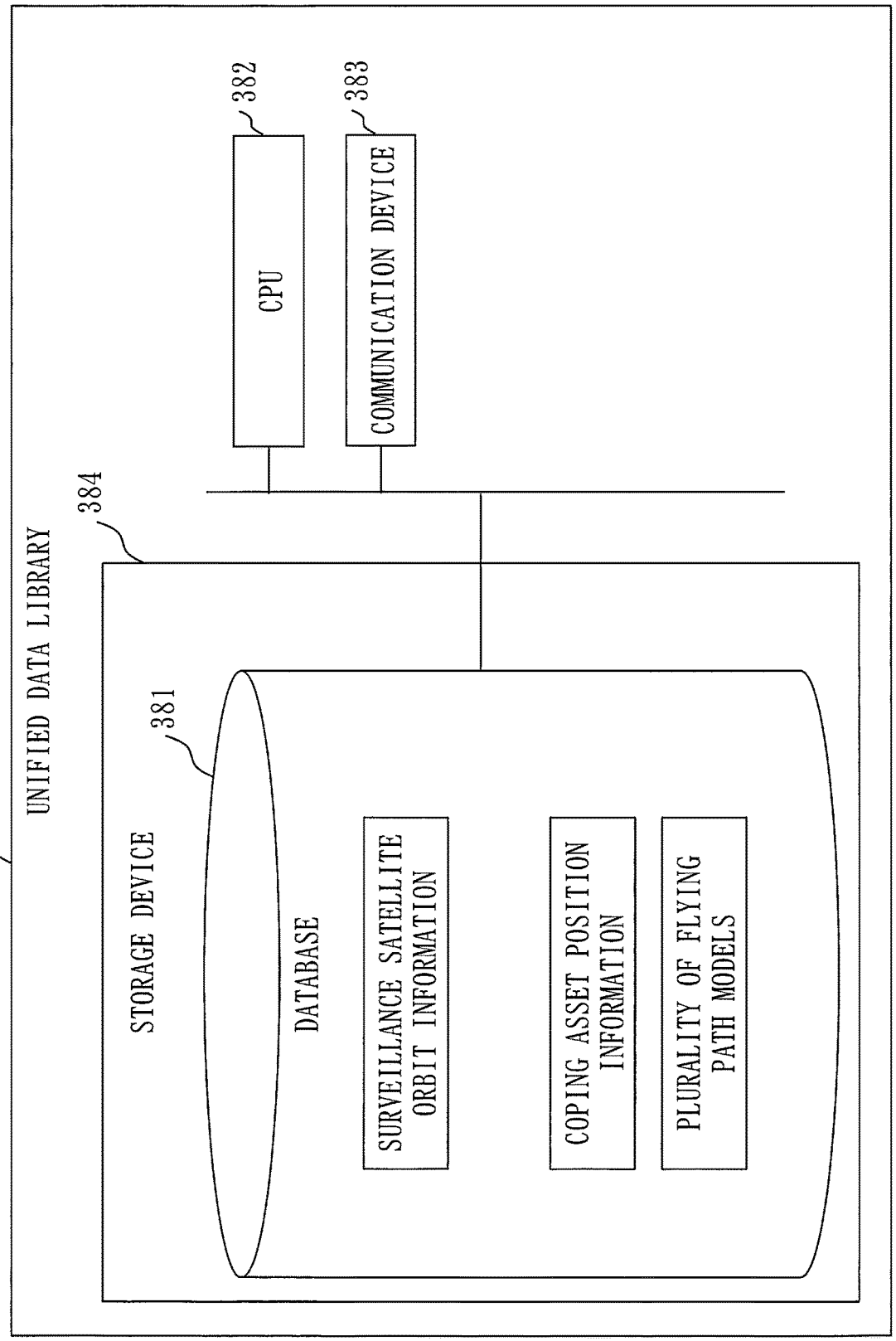
FIG. 11 is a diagram of Embodiment 2, illustrating hardware structure of the unified data library.

The unified data library 380 includes, as illustrated in FIG. 11 described below, the database 381 having stored therein at least one of orbit information of the surveillance satellite 100, position information of the coping asset 332, and a plurality of flying path models.

Here, the plurality of flying path models are a plurality of models configured by using launch position coordinates, a flying direction, a time-series flying distance from a launch to an impact, and a flying altitude profile of the flying object 520, the models having flying paths modeled therein.

As in FIG. 10, the unified data library 380 is arranged on the ground, but the unified data library 380 may be arranged in a satellite.

FIG. 11 illustrates hardware structure of the unified data library 380. The unified data library 380 is a computer. The unified data library 380 includes a CPU 382, a communication device 383, and a storage device 384. The storage device 384 implements the database 381.

<Cloud Computing: Satellite Equipped with Edge Server 390>

With an increase in the amount of information together with sophistication of information society, an increase in power consumption and measures against exhaust heat become problems. In particular, in a centralized mechanism, an increase in power and measures against exhaust heat of a supercomputer and a large-sized data center have become serious problems.

On the other hand, in outer space, heat can be exhausted into deep space by radiational cooling. Thus, a supercomputer or data center for implementing a cloud environment is arranged on a satellite constellation side and arithmetic processing is performed in the orbit, and then only necessary data can be transferred to users on the ground. This has an effect of maintaining the cloud environment and reducing the greenhouse effect gas exhaust amount, thereby making it possible to contribute to the SDGs on the ground.

<Edge Computing>

As a scheme for achieving a distributed architecture, edge computing has attracted attention in which an edge server is arranged on an IoT side.

In conventional IoT, a centralized mechanism has been generally applied, in which data collected by a sensor is transmitted via the Internet to a cloud for analysis. By contrast, in edge computing, a mechanism is taken in which data processing is performed as distributed at the device main body or an edge server installed between the device and the cloud, thereby implementing real-time and low-load data processing.

Further, with an increase in the amount of information together with sophistication of information society, an increase in power consumption and measures against exhaust heat become problems. In particular, in a centralized mechanism, an increase in power and measures against exhaust heat of a supercomputer and a large-sized data center have become serious problems.

On the other hand, in outer space, heat can be exhausted into deep space by radiational cooling. Thus, by regarding the satellite as a device in IoT, it is rational to arrange an edge server on a satellite constellation side and perform distributed computing process in the orbit, and then transfer only necessary data to the ground. According to a hybrid constellation, this has an effect in which low latency and unified data management can be achieved by transmitting and receiving information via an annular communication network or a mesh communication network to and from a cloud including a data center in the ground facility 700.

In FIG. 10, the surveillance satellite 100 in the flying path prediction method of Embodiment 1 may be configured to include an edge server 390 having the database 381.

Figure 12:
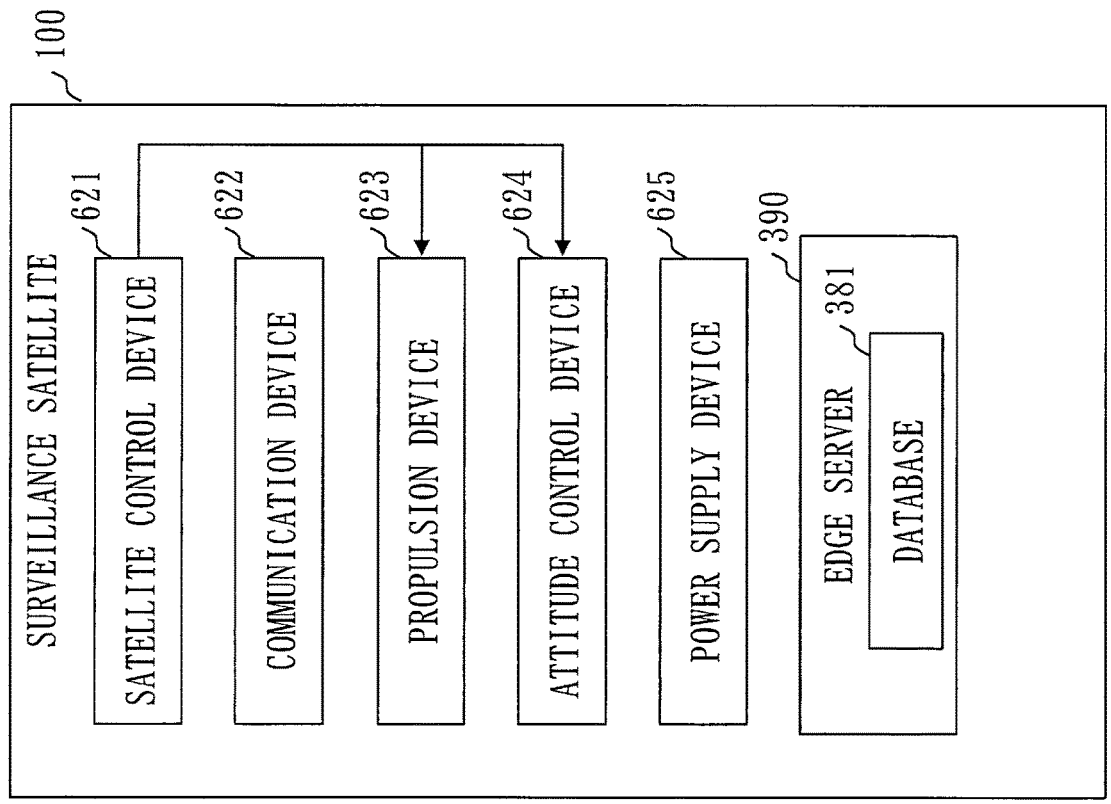
FIG. 12 is a diagram of Embodiment 2, illustrating a satellite equipped with an edge server.

FIG. 12 illustrates a structure in which the surveillance satellite 100 is equipped with the edge server 390 having the database 381. Note in FIG. 12 that the surveillance device of the surveillance satellite 100 is omitted. The hardware structure of the edge server 390 has a structure similar to that of the unified data library 380 of FIG. 11.

<Artificial Intelligence Calculator 391>

Artificial intelligence is described below. Artificial intelligence may be hereinafter denoted as AI.

Neural networks in artificial intelligence are classified into supervised learning in which optimization to a problem is furthered through input of teacher signals (correct answers) and unsupervised learning without requiring teacher signals.

With learning by taking flying object types, propellant types, and flying models of a plurality of typical patterns as teacher models in advance, an inference of actual measurement data with orbit information acquired by detecting a launch can be facilitated and speeded. As a result of the inference, flying object path prediction and estimation of a landing point are performed.

However, to predict a flying path of a flying object whose flying direction is unknown at a launch detection stage, it is required to track and conduct surveillance of the flying object by a subsequent surveillance satellite. Also, to transmit launch detection information to a subsequent surveillance satellite, it is required to pass the launch detection information via a communication network formed of a communication satellite group.

In a communication network by a communication satellite constellation, the flying positions of the communication satellites change with time. Thus, it is required to conduct an optimal communication route search to determine the ID of a communication satellite to transmit and receive the flying object information and transmission and reception times. This situation similarly applies to transmission and reception of the flying object information between a surveillance satellite and a communication satellite.

When an optimal route search is conducted in a ground system, it is required to conduct command transmission to the surveillance satellite and the communication satellite regarding the times of transmitting and receiving the flying object information and the satellite IDs. However, a communication network for command transmission becomes a problem.

To address this, it is rational that the communication satellite includes an analyzing device by AI, conducts an optimal route search in the orbit, and generates a command in the orbit to the communication satellite configuring a communication route for communication.

As a scheme of searching for an optimal route in the orbit, an optimal route search by the algorithm known as the Dijkstra method is effective. Note that while weighting for each route does not change in the static Dijkstra method, the weight for each route changes at each time by the change of the flying position of the communication satellite in the communication network formed of the communication satellite constellation. Thus, for each individual communication satellite conducting an optimal route search while updating the orbit information, operation is repeated in which the communication satellite receiving the flying object information conducts an optimal route search and transmits the flying object information to the next communication satellite.

Also, in route search, a breadth-first search and a depth-first search have been known. For launch detection information, it is rational to prioritize a quick transfer of the flying object information to the communication network by breadth-first search. In a stage in which tracking is repeated at the subsequent satellites and the flying direction can be substantially estimated, it is rational to conduct a depth-first search.

In the flying object tracking system, while the above-described flying path prediction and Dijkstra-method route search by machine learning are repeated, tracking surveillance of the flying object is performed to infer a final landing point.

Furthermore, after flying object tracking is repeated, machine learning is performed on previous achievements of flying object tracking, and deep learning is performed on case examples of flying object operation different from the plurality of flying object models used as teacher models.

This makes it possible to improve accuracy in prediction of a path of the flying object and expedite prediction.

Since the flying direction and the distance of a flying object launched not from a fixed launcher but from a transporter erector launcher (TEL) or the like and a typical flying model have a difference, it is effective to complement the orbit model by deep learning with respect to actual measurement data.

Figure 13:
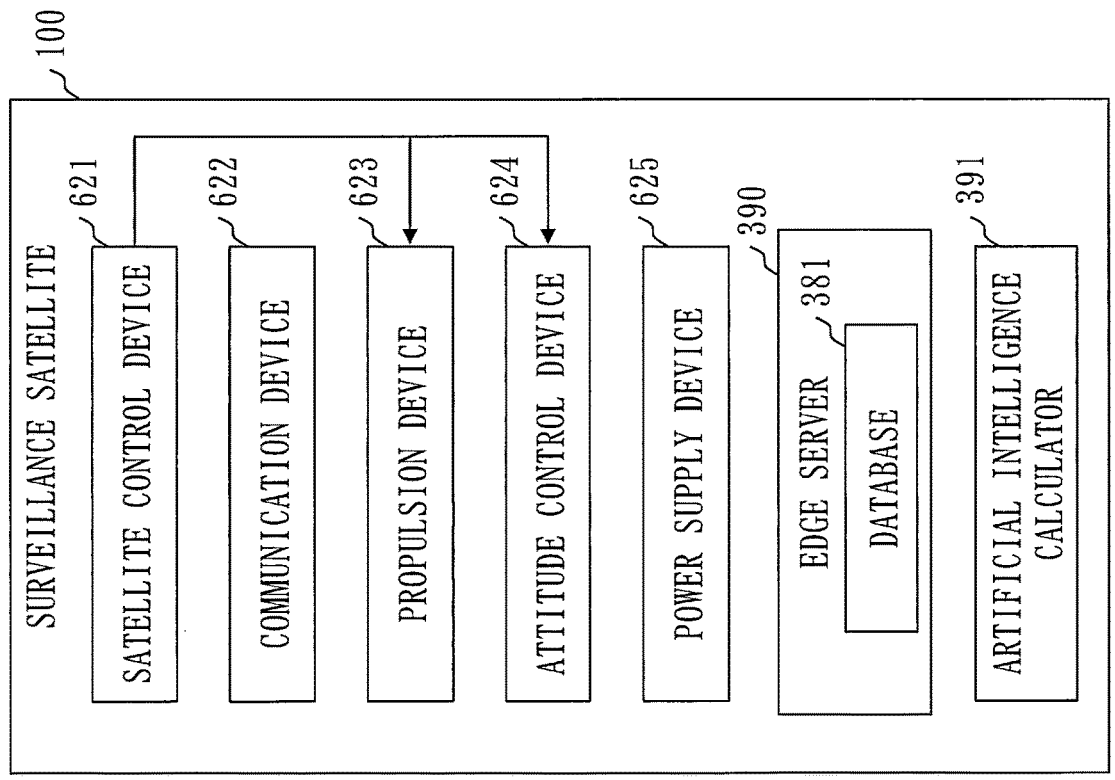
FIG. 13 is a diagram of Embodiment 2, illustrating a satellite equipped with an artificial intelligence calculator.

FIG. 13 illustrates a structure in which the surveillance satellite 100 includes the artificial intelligence calculator 391. The surveillance satellite 100 including the edge server 390 including the database 381 may be configured to include the artificial intelligence calculator 391. The artificial intelligence calculator 391 autonomously determines a transfer destination of the flying object information by referring to the database 381, and transmits the flying object information to the determined transfer destination. The artificial intelligence calculator has the effects described in <Artificial Intelligence Calculator> above.

Figure 14:
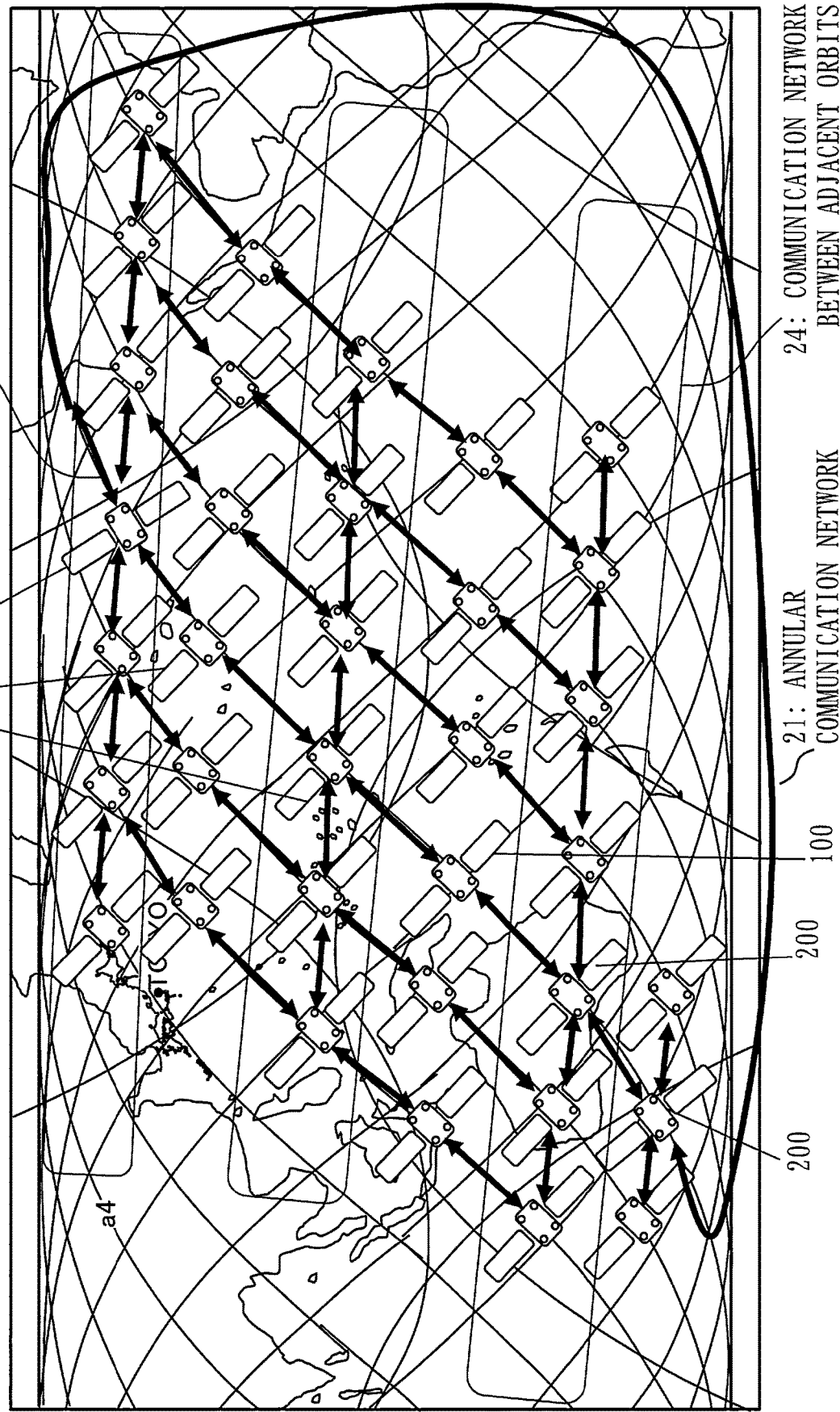
FIG. 14 is a diagram of Embodiment 2, illustrating a satellite constellation having an annular communication network and a mesh communication network.

FIG. 14 illustrates a satellite constellation 20 of Embodiment 2. As the satellite constellation 20 formed of the surveillance satellite 100 and a communication satellite 200 configuring a flying object tracking system to perform launch detection of the flying object and tracking of the flying object by using the flying path prediction method described in Embodiment 1, the satellite constellation of FIG. 14 is configured in Embodiment 2. The satellite constellation of FIG. 14 is as follows.

The plurality of communication satellites 200 each including a communication device to communicate with satellites at front and rear in a forwarding direction on the same orbital plane form a communication constellation of an annular communication network 21, and surveillance satellites 100 each including a communication device to communicate with satellites at front and rear fly among the plurality of communication satellites 200 forming the communication constellation of the annular communication network 21. In FIG. 14, a same orbital plane 23 is illustrated as a representative of the same orbital plane.

The surveillance satellites 100 and the plurality of communication satellites 200 configuring the communication constellation reconstruct the annular communication network 21 or reconstruct a mesh communication network 22 with adjacent orbits, forming a hybrid constellation of surveillance and communication.

The hybrid constellation indicates a constellation to achieve a plurality of missions including missions other than communication, such as observation and positioning, and communication missions, the constellation being formed when communication satellites forming a communication network are each also equipped with a device with a mission other than communication, such as observation or positioning or when satellites other than communication satellites, such as observation satellites or positioning satellites, are each also equipped with a communication device which plays a role of part of the communication network. Via the annular communication network 21 or the mesh communication network 22, ground users and the hybrid constellations can transmit and receive information. Also, there is an effect in which data unified management with low latency can be achieved on each satellite configuring the hybrid constellation and distributed computing regarded as IoT (Internet of Things). The satellite is equipped with part of the functions of a cloud data center, which has been conventionally installed on the ground, as a space data center. Then, there is an effect in which, in the orbit, a certain process is performed and only the process result is transferred to the ground, thereby making it possible to contribute to a reduction in load of process on the ground. For example, it is rational to conduct a shortest route search when the pieces of orbit information of the respective individual communication satellites configuring a communication satellite consternation are collected at the space data center and information transfer is made via an annular communication network or a mesh communication network formed of the communication satellite constellation. According to the conventional technology, after orbit information collection is transferred from the satellites to the ground, analysis and evaluation are performed on the ground and the result is transmitted to the ground. Thus, by autonomously undertaking the process in outer space, the data amount is reduced, and the load of the ground process is reduced.

REFERENCE SIGNS LIST

21: annular communication network; 22: mesh communication network; 23: orbit plane; 100: surveillance satellite; 101: first infrared surveillance device; 102: second infrared surveillance device; 200: communication satellite; 332: coping asset; 335: flying path prediction method; 340: ground system; 382: CPU; 383: communication device; 384: storage device; 350: model database; 351: flying path model selecting part; 360: flying object tracking system; 370: flying object coping system; 380: unified data library; 381: database; 390: edge server; 391: artificial intelligence calculator; 490: flying path prediction device; 520: flying object; 610: satellite constellation; 620: satellite; 621: satellite control device; 622: communication device; 623: propulsion device; 624: attitude control device; 625: power supply device; 626: surveillance device; 700: ground facility; 910: processor; 911: satellite constellation forming part; 921: memory; 922: auxiliary storage device; 930: input interface; 940: output interface; 950: communication device; 910A: processor; 921A: memory; 922A: auxiliary storage device; 930A: input interface; 940A: output interface; 950A: communication device

The invention claimed is:

1. A flying path prediction method comprising:
predicting a flying path of a flying object by analyzing, at a ground system, flying object surveillance information acquired by a surveillance satellite in a satellite constellation including a plurality of surveillance satellites each including an infrared surveillance device, wherein
the ground system includes a database having stored therein a plurality of flying path models being a plurality of flying paths modeled for the flying object, including launch position coordinates, a flying direction, a time-series flying distance from a launch to an impact, and a flying altitude profile of the flying object, and
the ground system
analyzes flying object surveillance information including
an elapsed time after launch detection measured by the infrared surveillance device included in a subsequent surveillance satellite by using the plurality of flying path models by taking launch detection information of the flying object detected by the infrared surveillance device of the surveillance satellite as a starting point,
a flying distance of the flying object, and
a flying altitude of the flying object,
the flying object surveillance information being measured by the subsequent surveillance satellite, and excludes a nonconforming flying path model from among the plurality of flying path models,
analyzes the flying object surveillance information measured by a next subsequent surveillance satellite, thereby repeatedly performing process of excluding a nonconforming flying path model from among the plurality of flying path models,
determines a flying path model not excluded to be left as a provisional flying path prediction model, and
based on flying object surveillance information measured by a plurality of subsequent surveillance satellites subsequent to the surveillance satellite detecting the launch detection information of the flying object, corrects a deviation amount from the provisional flying path prediction model to predict a flying path to the impact of the flying object.

2. The flying path prediction method according to claim 1, wherein
the plurality of surveillance satellites include
a first infrared surveillance device oriented to a geocentric direction, and
a second infrared surveillance device oriented to a circumference of the earth,
the first infrared surveillance device detects high-temperature spray accompanying at a launch of the flying object to be taken as a starting point of the flying path model, and
the second infrared surveillance device detects, in a cosmic background, a main body of the flying object with an increase in temperature after end of injection to be taken as reference information midway through flying of the flying path model.

3. A ground system to perform the flying path prediction method according to claim 1.

4. A flying path model of a flying object for use in the flying path prediction method according to claim 1.

5. A flying path prediction device to perform the flying path prediction method according to claim 1, the flying path prediction device comprising:
a database having stored therein a plurality of flying path models being a plurality of flying paths modeled for the flying object, including launch position coordinates, a flying direction, a time-series flying distance from a launch to an impact, and a flying altitude profile of the flying object; and
processing circuitry, with flying object surveillance information launch-detected by the surveillance satellite as a starting point, to compare the flying object surveillance information measured by a subsequent surveillance satellite with the plurality of flying path models and to select a flying path model with a smaller deviation amount from among the plurality of flying path models.

6. The flying path prediction device according to claim 5, wherein
the processing circuitry compares the selected flying path model with the flying object surveillance information measured by the surveillance satellite, corrects a deviation amount, and generates a corrected flying path prediction result.

7. A flying object tracking system comprising:
a satellite constellation; and
a ground system, wherein
the flying object tracking system performs launch detection of the flying object and tracking of the flying object, and
the ground system includes the flying path prediction device according to claim 5.

8. A flying object coping system comprising:
a satellite constellation;
a ground system; and
a coping asset, wherein
the ground system includes the flying path prediction device according to claim 5 to transfer flying object information to the coping asset near a predicted flying path.

9. A ground system including the flying object coping system according to claim 8.

10. A unified data library to be referred to by at least either of the surveillance satellite and the ground system in the flying path prediction method according to claim 1, the unified data library comprising:
a database having stored therein at least one of
orbit information of the surveillance satellite,
position information of a coping asset, and
a plurality of flying path models configured by using launch position coordinates, a flying direction, a time-series flying distance from a launch to an impact, and a flying altitude profile of the flying object, the flying path models having flying paths modeled therein.

11. A surveillance satellite in the flying path prediction method according to claim 1, the surveillance satellite comprising:
an edge server including a database having stored therein at least one of
orbit information of the surveillance satellite,
position information of a coping asset, and
a plurality of flying path models configured by using launch position coordinates, a flying direction, a time-series flying distance from a launch to an impact, and a flying altitude profile of the flying object, the flying path models having flying paths modeled therein.

12. The surveillance satellite according to claim 11, wherein
the surveillance satellite including the edge server includes an artificial intelligence calculator to autonomously determine a transfer destination of flying object information as a transfer destination by referring to the database and to transmit the flying object information to the determined transfer destination.

13. A satellite constellation formed of a surveillance satellite and a plurality of communication satellites configuring a flying object tracking system to perform launch detection of a flying object and tracking of the flying object by using the flying path prediction method according to claim 1, wherein
a plurality of satellites each including a communication device to communicate with satellites at front and rear in a forwarding direction on a same orbital plane form a communication constellation of an annular communication network,
the surveillance satellite including a communication device to communicate with front and rear satellites flies among the plurality of communication satellites forming the communication constellation, and
the surveillance satellite and the plurality of communication satellites forming the communication constellation reconstruct the annular communication network or reconstruct a mesh communication network with adjacent orbits, forming a hybrid constellation of surveillance and communication.

14. A flying object tracking system comprising:
a satellite constellation; and
a ground system, wherein
the flying object tracking system performs launch detection of the flying object and tracking of the flying object, and
the ground system includes the flying path prediction device according to claim 6.

15. A flying object coping system comprising:
a satellite constellation;
a ground system; and
a coping asset, wherein
the ground system includes the flying path prediction device according to claim 6 to transfer flying object information to the coping asset near a predicted flying path.

* * * * *